United States Patent [19]

Eaves

[11] Patent Number: 4,640,408
[45] Date of Patent: Feb. 3, 1987

[54] FEEDER WITH AUTOMATIC ZONED PRODUCT TIMING CORRECTION

[75] Inventor: Fred W. Eaves, Clayton, Wis.
[73] Assignee: Doboy Packaging Machinery, Inc., New Richmond, Wis.
[21] Appl. No.: 694,086
[22] Filed: Jan. 23, 1985

Related U.S. Application Data

[63] Continuation of Ser. No. 456,614, Jan. 10, 1983, abandoned.

[51] Int. Cl.⁴ .............................................. B65G 47/26
[52] U.S. Cl. .................................... 198/460; 198/575; 198/577
[58] Field of Search ............... 198/460, 466, 577, 575, 198/579, 464.3

[56] References Cited

U.S. PATENT DOCUMENTS

| | | | |
|---|---|---|---|
| 3,075,630 | 1/1963 | Fisk | 198/460 X |
| 3,200,932 | 8/1965 | Metz et al. | 198/460 |
| 3,212,622 | 10/1965 | Metz | 198/460 |
| 3,452,856 | 7/1969 | Brittain | 198/577 X |
| 3,822,009 | 7/1974 | Richards | 198/577 X |
| 4,197,935 | 4/1980 | Aterianus et al. | 198/466 X |
| 4,240,538 | 12/1980 | Hawkes et al. | 198/460 X |
| 4,360,098 | 11/1982 | Nordstrom | 198/575 X |
| 4,394,896 | 7/1983 | McComas et al. | 198/577 X |

FOREIGN PATENT DOCUMENTS

| | | | |
|---|---|---|---|
| 2346407 | 3/1974 | Fed. Rep. of Germany | 198/460 |
| 2708762 | 9/1977 | Fed. Rep. of Germany | 198/460 |
| 2840697 | 12/1979 | Fed. Rep. of Germany | 198/460 |
| 55-44489 | 3/1980 | Japan | 198/577 |

Primary Examiner—Robert J. Spar
Assistant Examiner—Jonathan D. Holmes
Attorney, Agent, or Firm—Orrin M. Haugen; Thomas J. Nikolai

[57] ABSTRACT

For use with an automatic high speed packaging machine in which products are wrapped and sealed, a control system for a feed conveyer for precisely positioning the incoming products to be wrapped relative to the wrapper's in-feed conveyer. The automatic feeder system leading to the wrapper's in-feed conveyer consists of a plurality of belts and photoelectric eyes are used to sense the presence or absence of product on the belts. The signals from the electronic eyes are applied to a control network to either increase or decrease the speed of selected belts relative to a preceding one to ensure that the product will be fed in a steady stream and at appropriately spaced intervals into the pushers of the wrapper's in-feed conveyer.

7 Claims, 4 Drawing Figures

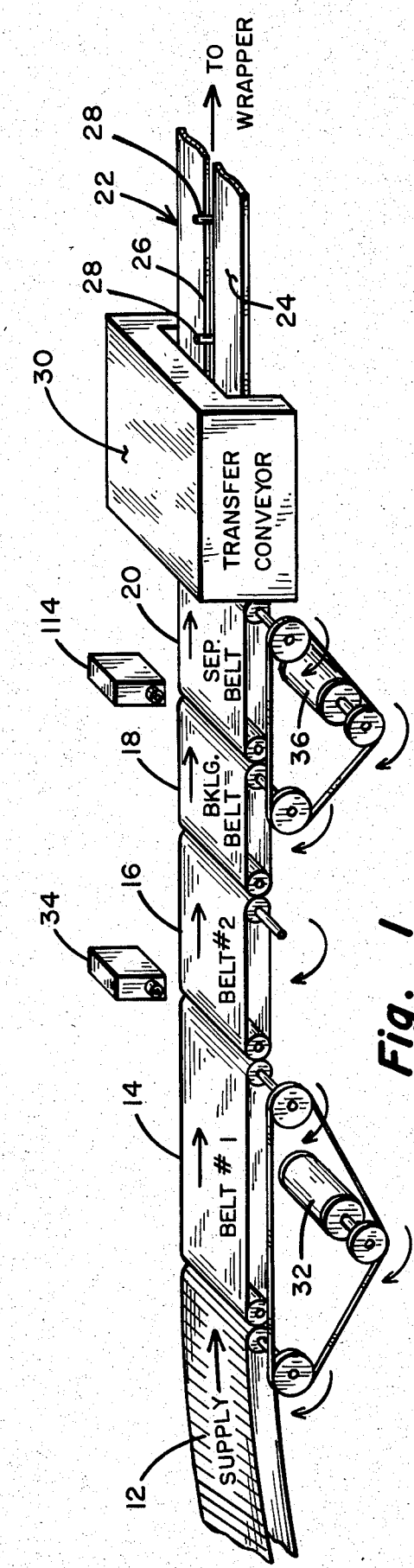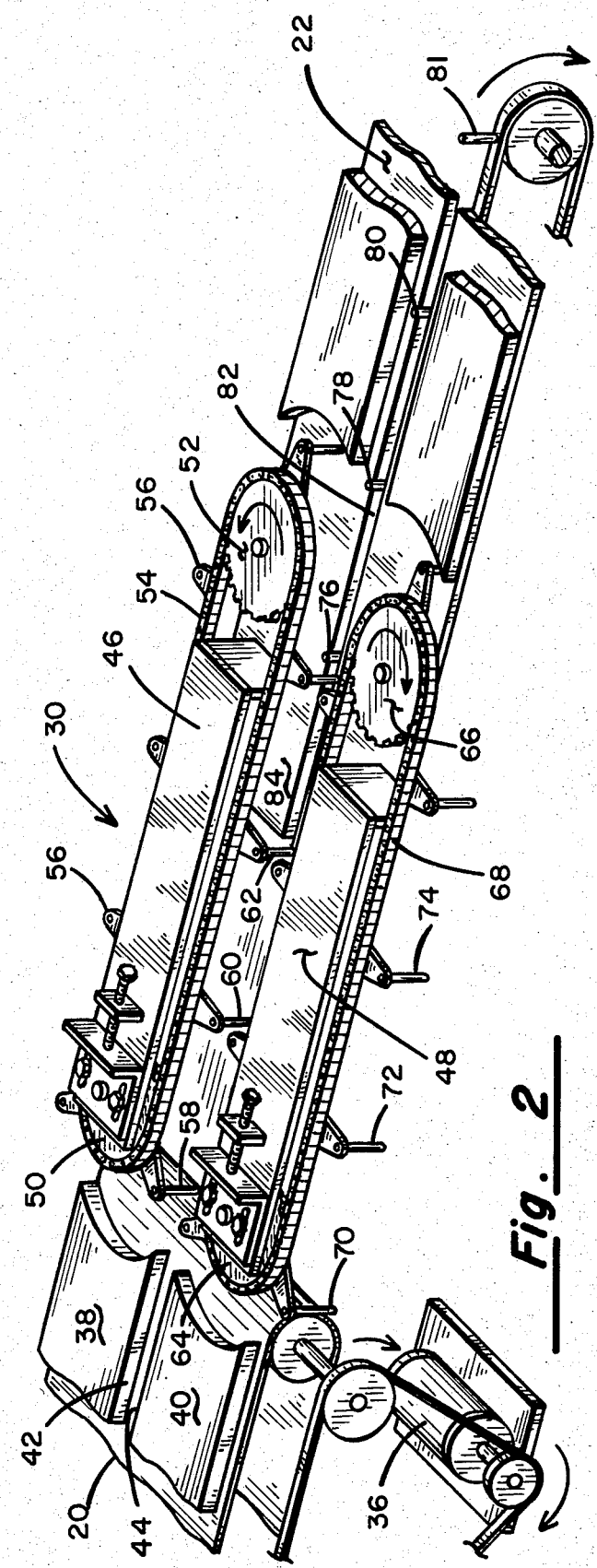

| CORRECTION | ZONE | TIMING |
|---|---|---|
| 140° DELAY | 1 | PRODUCT VERY EARLY |
| 90° DELAY | 2 | PRODUCT EARLY |
| 90° ADVANCE | 3 | PRODUCT LATE |
| 140° ADVANCE | 4 | PRODUCT VERY LATE |
| NONE | 5 | PRODUCT PROPER TIMING |

| ZONE | SPEED CHANGE |
|---|---|
| 1 | 40% DECREASE |
| 2 | 25% DECREASE |
| 3 | 25% INCREASE |
| 4 | 40% INCREASE |
| 5 | NONE |

FEEDER WITH AUTOMATIC ZONED PRODUCT TIMING CORRECTION

This is a continuation of application Ser. No. 456,614 filed Jan. 10, 1983, now abandoned.

BACKGROUND OF THE INVENTION

This invention relates generally to high speed packaging machines and more particularly to a feeder conveyer system for supplying product to the wrapper apparatus at a preset rate and with appropriate spacing between each product so that packages of uniform appearance will be produced.

In high speed packaging machines with which the present invention finds use, products are fed into a film forming station wherein a film, such as cellophane, polyethylene or paper, is formed into a continuous and moving tube about the products as the tube moves in synchrony through sealing and severing stations. In that the film generally has labels and other graphic material thereon, it is essential that the products, at all times, be synchronized with the film if the wrapped products are to look identical upon exit from the packaging machine. For exemplary purposes and with no limitation intended, let it be assumed that the products being wrapped are candy bars. The unwrapped bars exiting from the chocolate coating station normally travel along a cooling conveyer and, when sufficiently cool, are swept in batches from a holding platform onto a first conveyer belt which is arranged to pass just beneath converging vertical side walls of a guide so that the bars will be oriented in a serial train, one behind the other. At this point, however, the spacing between each bar is random, there being gaps of differing lengths between adjacent bars. Next, the bars are transferred to a backlog belt controlled by an electric eye. If a space between two adjacent bars is noted, the conveyer preceding the backlog belt is speeded up, allowing the later arriving bars to catch up to the preceding one. Where no space between bars is detected, the belt or belts leading to the backlog belt is again made to move at its slower rate. Thus, upon exiting the backlog belt, the bars are in a serial train with no gaps between adjacent bars.

Next, it is desired that the bars be spaced from one another by a predetermined amount so that they may be fed, via a transfer conveyer, into the in-feed conveyer of the wrapper system. The spacing is achieved by a further conveyer belt, termed the separation belt, which is driven by an electronically controlled servo motor. It is desired that the separation belt be driven sufficiently fast to space the bars correctly to fit within a flight, i.e., between adjacent pusher fingers on the side chains comprising the transfer conveyer. The side chains are driven in synchronism with the in-feed conveyer of the wrapper, such that if the bars are properly oriented with respect to the transfer conveyer, they will also be properly deposited between pushers comprising the wrapper's in-feed conveyer. Thus, the key is to appropriately control the speed of the separation belt such that the specified spacing between adjacent products results.

In prior art systems of the type thus far described, it is not uncommon for an empty space to occur on the backlog belt. Also, occasionally, the products, e.g. candy bars, do not separate cleanly as they pass from the backlog belt to the separation belt. This often leads to product damage as the products become pinched between opposed pusher fingers attached to the side chains of the transfer conveyer or alternatively, empty wrappers may exit the machine. It will also be apparent to those skilled in the art that the first products into a previously empty feeder arrive at the separation belt asynchronously with respect to the transfer mechanism. Thus, in the prior art systems, operator intervention is required upon start-up to insure proper operation of the packaging machine.

The present invention constitutes an improved control system for a feeder conveyer associated with a high speed packaging machine. Specifically, the control system of the present invention is capable of sensing the position of a product on a separation belt relative to the position of a flight on the side chains of the transfer conveyer with that flight being arbitrarily divided into a plurality of discrete zones. Associated with each of these zones is a predetermined change in speed of the separation belt. Thus, for example, a photocell arrangement disposed one flight length from the end of the separation belt is used to sense the leading edge of each product passing across that belt. An absolute shaft encoder and associated electronics provide signals indicative of, for example, five zones making up a side chain pusher flight. If it is assumed that the product, at the time its leading edge is sensed, is slightly too far forward for correct placement between two pusher fingers on the side chains, the separation belt will be made to slow down and the amount of the slowdown will be dependent upon just how far the product is out of time in relation to the zones defined by the shaft encoder. If the product is slightly too far backward relative to the pusher fingers of the infeed conveyer at the time its leading edge is sensed, the separation belt will be made to speed up. Again, the rate of speed increase depends upon the position of the product in relation to the zones defined by the absolute shaft encoder at the time that the leading edge of the product passes a fixed electric eye.

The control system further includes a storage register which is clocked upon receipt of a leading edge signal from the electric eye and which captures the output from the shaft encoder. The outputs from this register are individually connected to a velocity servo control loop, the result being that the speed change signal to the motor driving the separation belt is a function of the degree to which the product leads or lags its ideal orientation for proper meshing with the flights of the transfer conveyer.

OBJECTS

It is accordingly a principal object of the present invention to provide a new and improved control system for a high speed packaging machine.

Another object of the invention is to provide a speed control system for a feed conveyer associated with a high speed wrapping machine which insures proper transition between a moving conveyer belt upon which a product is riding and an infeed conveyer in which the product is positively pushed.

Still another object of the invention is to provide a control system for a feeder associated with a high speed wrapping machine which is effective to properly position the product upon its exit from the feeder and its entrance into the in-feed conveyer of the wrapping machine.

Still a further object of the invention is to provide an electronic velocity servo and control system for providing a series of discreet speed adjustment voltages to the servo motor, the magnitude of each being determined by the disposition of the product on a conveyer belt relative to the orientation of the flights on a product pushing-type conveyer.

A yet further object of the invention is to provide a control system for a feeder associated with a high speed product wrapping machine which is effective to continuously feed product into the wrapper's in-feed conveyer with predetermined spacings maintained between successive products as they exit the feeder conveyer.

These and other objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE DRAWINGS

FIG. 1 is a mechanical schematic diagram of a feeder conveyer incorporating the present invention;

FIG. 2 is a perspective representation of the transfer conveyer portion of the feeder of FIG. 1;

DESCRIPTION OF THE PREFERRED EMBODIMENT

Figure 3:
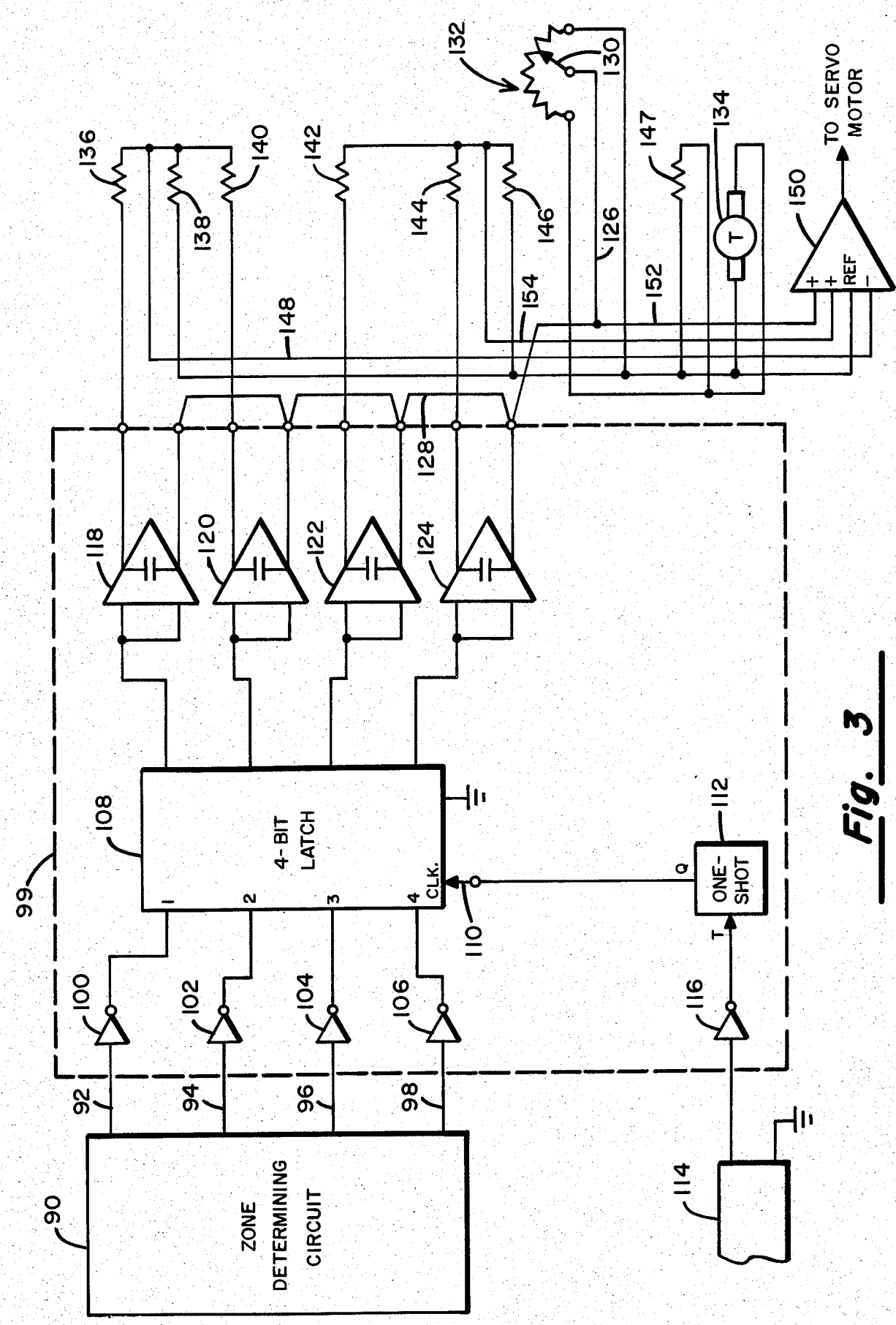
FIG. 3 is an electrical schematic diagram of the control system.

Referring to FIG. 1, there is shown by means of a mechanical schematic diagram a feeder conveyer for use with a high speed packaging machine or wrapper. The purpose of the feeder conveyer is to properly space and time the products to be wrapped so as to provide a uniformity of appearance of the wrapped articles once they are discharged from the machine. The feeder conveyer is seen to comprise a plurality of conveyer belts 12-20 which are sequentially disposed in a continuous path leading from a production machine (not shown) in which the articles are manufactured to the wrapping machine's in-feed conveyer 22. Conveyer sections 12-20 being of the moving belt type, the product is carried on top of these belts and moved because of the frictional engagement between the surface of the belt and the product being carried. To ensure proper spacing between products so that when inserted into the wrapping film the products will be properly aligned with any graphic material on the film, it is usually found necessary to push the product positively by a mechanical finger or the like into the film forming station of the wrapping machine. Thus, the in-feed conveyer 22 comprises a flat platform 24 having a longitudinal groove 26 formed therethrough for receiving a plurality of pushing fingers as at 28, the pusher fingers being connected to an endless chain (not shown) disposed beneath the platform 24 and driven at a rate corresponding to the rate at which the film material is drawn from its supply rolls and through the film former to create the wrapper enveloping the product as it flows through the machine. In that the in-feed conveyer chain (not shown) is driven at a predetermined speed related to the overall operation of the wrapping machine and because the product is positively pushed forward into the wrapping machine by the fingers coupled to the in-feed conveyer chain, the articles being wrapped will be precisely spaced, one behind the other, assuming they are properly deposited between the adjacent fingers on the in-feed conveyer. It is the function of the transfer conveyer 30 to remove the incoming products from the moving belt 20 and to deposit them between adjacent fingers 28 on the infeed conveyer.

In traveling from the supply conveyer 12 to the so-called separation belt 20, the products are sequentially carried by belts 14, 16 and 18. The belts 12 and 14 are adapted to be driven by the same drive source, here shown as a two-speed motor 32. The products exiting from the production machine (not shown) arrive on the supply belt 12 in a somewhat random fashion, i.e., the spacing between successive products on the belt 12 may vary in a random fashion with adjacent products touching one another in some instances and in other instances being separated by varying distances. The motor 32 is a multi-speed motor and, as such, may run at a first, lower speed and a second, higher speed. A photoelectric sensing device 34 is disposed above the conveyer belts, proximate the juncture between belts 14 and 16, and used to sense any gaps which may exist between adjacent products. If a product backlog condition, i.e., no space between adjacent products, extends from the backlog belt 18 rearward to the location of the photoelectric sensor 34, the supply conveyer 12 and belt number one of the feeder (belt 14) are driven at the lower speed by the motor 32. However, should the photosensor 34 detect a gap between adjacent products, the motor 32 is made to operate at its higher speed such that the products on the supply conveyer 12 and on belt number one move at a faster rate so as to catch up with those on belts 16 and 18. Belt 16 is driven at a constant speed greater than that of belt 18 by a shaft, not shown, which is geared to the drive shaft of the wrapper machine. The motor 32 continues to run at the higher speed so long as the backlog condition does not extend rearward to the photosensor 34.

Coupled in a driving relationship to the backlog belt 18 and the separation belt 20 is a variable speed motor 36. As will be explained in greater detail hereinbelow, the motor 36 is controlled by a servo loop whose primary input command is from a tachometer driven by the motor which drives the in-feed conveyer for the wrapping machine. Thus, the signal driving the motor 36 is at all times proportional to the rate at which the wrapping machine is driven. Furthermore, a manually adjustable potentiometer is provided for controlling the ratio of the speed of the motor 36 relative to that of the motor driving the in-feed conveyer of the wrapping machine. This speed ratio relates directly to the ratio of the length of the product being processed to that of the wrapper flight. In that the products on the backlog belt 18 should have no space between them, the speed of the backlog belt 18 equals the product's length multiplied by the product's flow rate. The separation belt 20 has drive gearing associated with it for causing it to run at a sufficiently high speed so as to "pull the gap", i.e., separate the products correctly so as to mate with the flights of the transfer conveyer 30.

Referring next to FIG. 2, there is shown a perspective view of the transfer conveyer mechanism 30 and its location relative to the separation belt 20 and the in-feed conveyer 22. Disposed above the separation belt 20 are longitudinal guide members 38 and 40, the guide members having spaced-apart vertical side walls 42 and 44 defining a product flow path which is aligned longitudinally with the path between apposed segments of the transfer conveyer 30. Specifically, the transfer conveyer comprises two spaced apart-side chain assemblies indicated generally by numerals 46 and 48, respectively. The leftmost side chain assembly comprises first and second spaced-apart sprocket wheels 50 and 52 which are journaled for rotation about vertical axes, one sprocket wheel being driven from the main motor of the wrapper or packaging machine. Disposed about the sprocket wheels 50 and 52 is an endless chain 54 and secured to the chain at spaced-apart intervals are a plurality of horizontally extending arms as at 56. The arms 56, in turn, support downwardly depending pusher fingers as at 58, 60 and 62. In a similar fashion, the right side-chain assembly 48 also comprises spaced-apart sprocket wheels 64 and 66, one of which is driven by the same motor as is used to drive the in-feed conveyer 22 of the wrapper. These sprocket wheels are spanned by an endless chain 68. This chain also carries downwardly depending pusher fingers 70, 72, 74 at predetermined spaced apart intervals. The arrows marked on the sprocket wheels 52 and 66 indicate the direction of rotation of these wheels and, as can be seen in FIG. 2, the pusher fingers 58, 60 and 62 on the left side chain assembly 46 are paired with corresponding pusher fingers on the right side chain assembly 48.

It is desired that the products being carried by the separation belt 20 be fed into the space between adjacent pusher fingers just in advance of the time when the rearmost pair of pusher fingers close behind the product and urge the product forward by contacting it and pushing it toward the in-feed conveyer assembly 22. The manner in which the speed of the separation belt 20 is adjusted to ensure this proper depositing of products between adjacent flights on the transfer conveyer comprises the control system of the present invention.

With continued attention to FIG. 2 of the drawings, the transfer conveyer 30 partially overlaps a portion of the in-feed conveyer 22. The in-feed conveyer itself comprises a pair of spaced apart sprocket wheels (not shown) which are journaled for rotation about horizontal axes and an endless chain extends between the two. Secured to the chain at spaced apart intervals are outwardly projecting pusher fingers, three of which can be seen in FIG. 2 and are identified by numerals 76, 78 and 80. These fingers project upwardly through a slot 82 formed in a horizontally disposed plate member 84. The movement of the chain supporting the pusher fingers 76, 78 and 80 is mechanically synchronized with the movement of the side-chains 54 and 68 and during setup suitable adjustments are made such that one of the pusher fingers of the in-feed conveyer chain will rise up through the slot 82 just as apposed pusher finger pairs on the adjacent span of the side-chains 54 and 68 pass the appropriate point in their travel whereby the product will now be pushed by the in-feed conveyer fingers 76, 78, etc.

It can be seen from FIG. 2 that unless the products leave the separation belt at the appropriate time relative to the arrival of apposed pusher fingers on the side chains, the product may be pinched between the pusher fingers of the side chain and thereby be damaged. Desired operation dictates that a matched pair of pusher fingers on each of the side chains come together immediately behind the product as the product enters between the side chains of the transfer conveyer.

Occasionally, an unwanted space occurs on the backlog belt. Furthermore, once in awhile products do not separate cleanly as they pass from the backlog belt 18 to the separation belt 20. The first product leaving the supply belt 12 and entering upon the first belt 14 of the feeder conveyer arrive at the separation belt asynchronously relative to the movement of the side chains of the transfer conveyer, which, as has been indicated, are driven in synchronism with the drive system of the wrapper's in-feed conveyer 22. It is the purpose of the present invention to provide suitable product position detection and correction while the product is on the feeder conveyer so as to prevent damage to the product by the side chain pusher fingers. The manner in which this is accomplished will now be explained in conjunction the electrical circuit diagram of FIG. 3.

Figure 4:
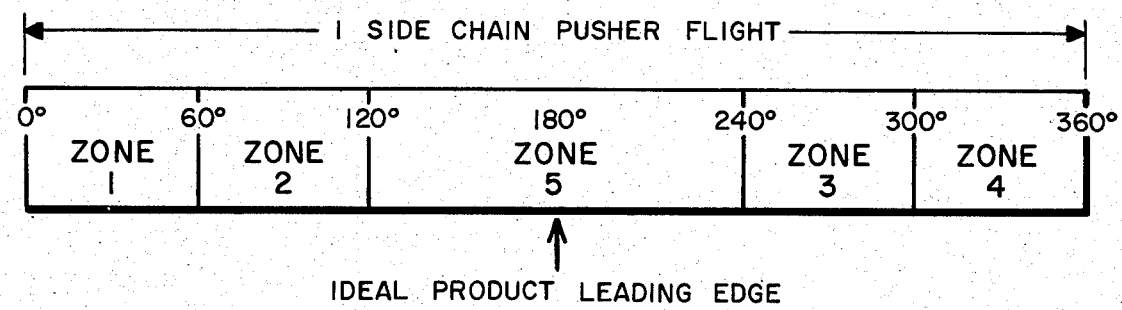
FIG. 4 illustrates the manner in which the distance between adjacent pusher fingers on the side chain transfer conveyer are arbitrarily divided into discrete zones.

Referring to FIG. 3, indicated by numeral 90 is a zone defining circuit which, in practice, may take any one of a number of forms. For example, the zone defining circuit may constitute rotatable cam-actuated switches which arbitrarily divide a given length into a plurality of zones and which provides a discrete output signal on one of the output lines 92 through 98 depending upon the positions of the individual cams associated with these lines. Referring momentarily to FIG. 4, it can be seen that the spacing between adjacent pusher fingers on the transitioned conveyer may be arbitrarily divided into five zones labeled Zone 1 through Zone 5. Zones 1 through 4 are each 60 angular degrees in length, with Zone 5 being 120 angular degrees. By way of further explanation, the cams comprising a portion of the zone defining circuit 90 may be driven by the same shaft used to drive the sprockets to which the side-chains 54 and 68 in FIG. 2 are coupled. Alternatively, the zone defining circuit 90 may comprise a so-called absolute shaft encoder and, as such, may include a resolver-type synchro device wherein the output signal varies as a function of the sine and cosine of the angle determined by the resolver's rotor relative to a predetermined reference point. A commercially available device which may be used effectively in implementing the zone defining circuit is a Type M1750 programmable limit switch available through the Autotech Corporation of Carol Stream, Illinois. Those desiring further information relative to that device are referred to the M1750 Programmable Limit Switch Installation, Programming and Service Manual made available by the Autotech Corporation.

Irrespective of the type of device used to implement the zone defining circuit 90, signals will be sequentially provided on the output lines 92 through 98 as the shaft driving the transfer conveyer chains revolves. These signals are coupled through buffer inverter circuits 100 through 106 as to the individual input terminals of a four-bit latch circuit 108. Connected to the clock input terminal 110 of the four-bit latch is the output from a one-shot circuit 112 which is arranged to be triggered by the output from a photosensor 114. A buffer inverter 116 may also be used to match the output from the photosensor 114 to the one-shot circuit 112.

The photosensor 114 is positioned toward the leading edge of the separation belt 20 (FIG. 1) about one flight's distance upstream from the entrance to the transfer conveyer 30. Each time a product passes beneath the photosensor 114, a clock pulse is applied to the clock input terminal 110 of the latch 108. Stored in the latch 108, then, is the particular pattern of input signals existing at the outputs from the buffer amplifiers 100–106 at the time that the latch is clocked. Because of the nature of the zone defining circuit 90, only one of the outputs 92 through 98 will be active at any given time, the particular one being determined by the angular position of the shaft driving the side chains of the transfer conveyer.

The outputs from the individual stages of the four-bit latch 108 are individually coupled to analog switches 118 through 124. As is indicated, the switches are normally non-conducting, i.e., open switch condition, but when a logical "1" signal is presented to it by the four-bit latch 108, the device becomes highly conductive, corresponding to a closed switch condition.

One terminal of each of the switches 118 through 124 is connected in common by conductors 126 and 128 to the wiper arm 130 of a potentiometer 132. Connected directly across the outer terminals of the potentiometer 132 is a tachometer 134 whose shaft is adapted to be driven by the main drive shaft of the wrapper machine itself. Thus, the signal applied across the potentiometer is proportional to the rate at which the wrapper's in-feed conveyer is moving.

The remaining terminal of the analog switch 118 is coupled through a voltage divider including the resistors 136 and 138 to an outer terminal of the potentiometer 132. In a similar fashion, the remaining output terminal of the analog switch 120 is coupled through a resistor 140 and the resistor 138 to that same potentiometer terminal. The remaining terminals of the analog switches 122 and 124 are respectively coupled through voltage dividers including the resistors 142, 144 and 146 to the appropriate terminal of the potentiometer 132.

The junction between the resistors 140 and 138 is connected by means of a conductor 148 to a first inverting input terminal of a servo amplifier 150 while the wiper arm 126 of the potentiometer 132 is coupled through a conductor 152 to a non-inverting input of the servo amplifier. Finally, the midpoint between the voltage divider resistors 142, 144 and 148 is coupled through a conductor 154 to a non-inverting input of the servo amplifier 150. The output from the servo amplifier connects to the drive motor 36 associated with the separation and backlog belts 20 and 18. Thus, when the system is energized and the wrapper motor (not shown) is driving the wrapper's in-feed conveyer 22 and the finwheels (not shown) used to draw the film from the supply rolls and through the wrapper's film former, the tachometer 134 will also be driven by that same motor and will produce an output voltage proportional to the speed at which the operative portions of the wrapping machine are functioning. This signal is applied directly across the outer terminals of the base speed reference potentiometer 132 and a fraction of that voltage is applied to one of the non-inverting inputs of the servo amplifier by way of the wiper arm 130 and the conductors 126 and 152. With no other correction signals being applied to the servo amplifier 150, the separation belt will, thus, be driven in synchronism with the other parts of the wrapper machine, including the transfer conveyer and the in-feed conveyer. This is the situation which prevails when products are being properly fed into the flights of the transfer conveyer. Stated otherwise and with reference to FIG. 4, the products are arriving so as to fall within the illustrated Zone 5.

Now let it be assumed that a product is arriving at the point monitored by the photocell 114 very early so that the zone defining circuit 90 is providing an output on line 92 indicative of a Zone 1 condition prevailing. This will cause a binary "1" signal to be applied via buffer amplifier 100 to input 1 of the four-bit latch 108. Thus, until the next clock pulse is applied via the photocell circuit 114 and the oneshot 112, stage one of the four-bit latch will remain set and, as a result, the analog switch 118 will be the only analog switch to be in its low impedence state. As a result, the voltage divider comprised of the resistors 136 and 138 will be connected across the base speed potentiometer 132 and a predetermined portion of the output from the tachometer 134 will be applied to the inverting input of the servo amplifier 150. This signal subtracts from the base speed signal obtained directly across the potentiometer 132 such that the control signal applied to the servo motor associated with the separation belt will be decreased. Thus, the separation belt will be driven at a substantially reduced speed, slowing down the product flow relative to the speed at which the flights of the transfer conveyer are moving. This slowdown then compensates for the fact that the product had arrived at the photocell 114 too early for proper insertion of the product between adjacent pusher fingers.

If rather than being way early the product had arrived only slightly early, the four-bit latch 108 would be clocked at the time that the zone defining circuit 90 was producing an output on its output line 94. This action would result in the analog switch 120 having its contacts closed which serves to connect the voltage divider including the resistors 138 and 140 across the base speed adjusting potentiometer 132. The resistive component values are such that a lesser voltage is now applied to the negative input terminal of the servo amplifier than was the case when analog switch 118 was active. This lesser voltage, when applied to the servo amplifier, causes the servo motor to slow down, but not to the degree of slowdown that takes place when the analog switch 118 is conducting.

In a very similar fashion, either the voltage divider comprised of the resistors 142 and 144 or 144 and 146 are connected to the positive input terminal of the servo amplifier if the clocking signal from the photocell 114 and one-shot circuit 112 arrive at a time that the zone defining circuit 90 has an active output on lines 96 or 98. The appropriate voltage fraction when combined in the servo amplifier with the reference voltage causes a speed-up of the servo motor with the degree of speed-up being determined by which of the particular zones is involved at the time of the clocking signal.

Zone 5 is associated with proper synchronization of the product's arrival on the separation belt and the motion of the transfer conveyer. Thus, if the product arrives between 120 degrees and 240 degrees, it can be transported on the separation belt at the system's base speed and no further correction signals need be applied to the servo amplifier 150 in order to have the product arrive in time to be inserted between adjacent fingers on the side chain transfer conveyers.

The invention has been described herein in considerable detail in order to comply with the Patent Statutes and to provide those skilled in the art with the information needed to apply the novel principles, and to construct and use such specialized complements as are required. However, it is to be understood that the invention can be carried by specifically different equipment and devices, and that various modifications, both as to equipment details and operating procedures can be accomplished without departing from the scope of the invention itself.

What is claimed is:

1. An electronic control system for a belt-type conveyer for causing products being carried thereby to be properly spaced for centering between adjacent pusher fingers defining a flight of a transfer mechanism, comprising in combination:

(a) first conveyer belt means adapted to receive products in ramdom sequence from a supply conveyer;

(b) first multi-speed motor means connected in driving relation only to said first conveyer belt means and said supply conveyer;

(c) backlog conveyer belt means for positioning said products in a serial head-to-tail touching relationshp and separation conveyer belt means respectively serially disposed downstream from said first conveyer belt means;

(d) second multi-speed motor means connected in driving relation only to said backlog conveyer means and said separation conveyer means with said separation conveyor means being continually driven at a speed slightly greater than the speed of said backlog conveyer means;

(e) electronic sensing means positionally associated with said backlog conveyer means for sensing the presence of a gap between adjacent products when said products are moving in the area between said backlog belt and said first conveyer belt means for increasing the speed of said first multi-speed motor means for closing said gap;

(f) servo control means for driving said second multi-speed motor means at a normal rate proportional to the speed of said transfer mechanism;

(g) zone defining means for establishing more than two discrete zones within said conveyer flight of said transfer mechanism, said zone defining means including means for generating a unique signal for each of said more than two discrete zones, and (h) means coupled to said zone defining means and to said servo control means for increasing or decreasing the rate of said second multi-speed motor means for said normal rate by one of more than two speed change values which depends upon the relative positioning of said conveyer flight of said transfer mechanism at the instant that a product reaches a predetermined location with respect to said separation belt.

2. The electronic control system as in claim 1 and further including storage means for at least temporarily storing the one of said unique signals existing at the instant a product reaches said predetermined location relative to said separation belt.

3. The electronic control system as in claim 2 and further including means for producing a speed altering signal for said servo control means, the magnitude of said speed altering signal being determined by the contents of said storage means.

4. The electronic control system as in claim 1 wherein said means for generating said unique signal for each of said more than two discrete zones comprises:

(a) shaft encoder means coupled to the drive means for said transfer mechanism, said shaft encoder means providing a plurality of successive output signals on a corresponding plurality of output lines as said shaft encoder means are driven by said drive means for said transfer mechanism.

5. The electronic control system as in claim 4 and further including photocell means for sensing the entry of a product on said separation belt; and memory means responsive to the output from said photocell means for storing the one of said unique signals existing on said plurality of output lines at the instant said product is sensed by said photocell means.

6. The electronic control system of claim 5 wherein said servo control means includes summing amplifier means coupled in driving relation to said second multi-speed motor means, means for applying a base signal voltage to a first input of said summing amplifier means and means for applying a control voltage to a second input of said summing amplifier means, said control voltage being dependent upon the value stored in said memory means.

7. The electronic control system as in claim 6 wherein said means for applying a base signal to said summing amplifier means comprises a tachometer driven by the drive means for said transfer mechanism.

* * * * *